United States Patent
Okada et al.

(10) Patent No.: US 10,311,188 B2
(45) Date of Patent: Jun. 4, 2019

(54) CIRCUIT DESIGN SUPPORT APPARATUS, CIRCUIT DESIGN SUPPORT METHOD, AND COMPUTER READABLE MEDIUM

(71) Applicant: MITSUBISHI ELECTRIC CORPORATION, Tokyo (JP)

(72) Inventors: Naoya Okada, Tokyo (JP); Ryo Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 73 days.

(21) Appl. No.: 15/556,180

(22) PCT Filed: Apr. 8, 2015

(86) PCT No.: PCT/JP2015/060955
§ 371 (c)(1),
(2) Date: Sep. 6, 2017

(87) PCT Pub. No.: WO2016/162970
PCT Pub. Date: Oct. 13, 2016

(65) Prior Publication Data
US 2018/0039722 A1 Feb. 8, 2018

(51) Int. Cl.
*G06F 17/50* (2006.01)
(52) U.S. Cl.
CPC ........ *G06F 17/5045* (2013.01); *G06F 17/505* (2013.01); *G06F 17/5072* (2013.01); *G06F 2217/06* (2013.01)

(58) Field of Classification Search
CPC . G06F 17/5045; G06F 17/505; G06F 17/5072
See application file for complete search history.

(56) References Cited

U.S. PATENT DOCUMENTS

| | | | | |
|---|---|---|---|---|
| 6,634,017 B2* | 10/2003 | Matsui | ............... | G06F 17/5022 716/102 |
| 7,904,850 B2* | 3/2011 | Spackman | .......... | G06F 17/5045 703/13 |
| 8,291,396 B1* | 10/2012 | Lau | ..................... | G06F 17/5054 716/104 |
| 8,621,414 B2* | 12/2013 | Lee | .......................... | G06F 8/10 716/101 |
| 8,627,257 B2* | 1/2014 | Kim | .................... | G06F 12/0246 716/132 |
| 8,719,744 B2* | 5/2014 | Oshima | ............... | G06F 17/5045 716/106 |

(Continued)

FOREIGN PATENT DOCUMENTS

| JP | 11-184895 A | 7/1999 |
|---|---|---|
| JP | 2008-204341 A | 9/2008 |

(Continued)

*Primary Examiner* — Stacy Whitmore
(74) *Attorney, Agent, or Firm* — Birch, Stewart, Kolasch & Birch, LLP

(57) ABSTRACT

A binding data acquiring unit acquires binding data describing a plurality of memory modules as functional modules of a design target circuit. A memory module selecting unit selects an external memory module to be implemented as an external memory outside of the design target circuit from the memory modules described in the binding data on the basis of a constraint condition on the design target circuit.

10 Claims, 13 Drawing Sheets

(56) References Cited

U.S. PATENT DOCUMENTS

| | | | | |
|---|---|---|---|---|
| 9,171,114 B2* | 10/2015 | Hakewill | G06F 9/30145 | |
| 9,727,682 B2* | 8/2017 | Subramaniam | G06F 17/5068 | |
| 2003/0028854 A1* | 2/2003 | Nishida | G06F 17/5045 | |
| | | | | 716/103 |
| 2003/0179625 A1* | 9/2003 | Tojima | G06F 1/10 | |
| | | | | 365/200 |
| 2007/0028204 A1* | 2/2007 | Takeda | G06F 17/504 | |
| | | | | 716/103 |
| 2008/0184180 A1* | 7/2008 | Takenaka | G06F 17/5022 | |
| | | | | 716/103 |
| 2012/0096418 A1* | 4/2012 | Takenaka | G06F 17/5022 | |
| | | | | 716/104 |
| 2013/0014091 A1* | 1/2013 | Oshima | G06F 17/5045 | |
| | | | | 717/137 |
| 2013/0152031 A1* | 6/2013 | Hakewill | G06F 9/30145 | |
| | | | | 716/104 |
| 2016/0246911 A1* | 8/2016 | Subramaniam | G06F 17/5068 | |
| 2017/0177780 A1* | 6/2017 | Harper | G06F 17/5081 | |

FOREIGN PATENT DOCUMENTS

| | | |
|---|---|---|
| JP | 2011-022863 A | 2/2011 |
| JP | 2011-134308 A | 7/2011 |

* cited by examiner

Fig. 4

| CYCLE TIME THRESHOLD Tth | 1500 |
|---|---|
| LATENCY CONSTRAINT Lmax | 400 |
| CIRCUIT SCALE CONSTRAINT Smax | 300,000 |
| OPTIMIZATION POLICY INFORMATION P | PRIORITY TO CIRCUIT SCALE |
| EXTERNAL MEMORY CONFIGURATION INFORMATION Minfo | DDR_SDRAM |

Fig. 7

| MEMORY NAME | (1) CYCLE TIME WHEN WRITE ACCESS IS TERMINATED | (2) CYCLE TIME WHEN LAST READ ACCESS TO WRITE DATA IS STARTED | Ts ((2)-(1)) | DETERMINATION RESULT (Ts≧Tth) |
|---|---|---|---|---|
| mem1 | 2000 | 11000 | 9000 | YES |
| mem2 | 4100 | 4100 | 0 | NO |
| mem3 | 6300 | 6300 | 0 | NO |
| mem4 | 6300 | 8500 | 2200 | YES |
| mem5 | 8500 | 8500 | 0 | NO |
| mem6 | 11000 | 11000 | 0 | NO |

Fig. 11

| No. | EXTERNAL MEMORY MODULE CANDIDATE |
|---|---|
| 1 | mem1 |
| 2 | mem4 |
| 3 | mem5 |
| 4 | mem6 |

Fig. 12

| No. | WHETHER TO BE IMPLEMENTED AS EXTERNAL MEMORY (EXTERNAL: IMPLEMENTED AS EXTERNAL MEMORY; INTERNAL: IMPLEMENTED AS INTERNAL MEMORY) | | | | | | CIRCUIT SIZE OF ENTIRE LSI | PROCESSING LATENCY OF ENTIRE LSI |
|---|---|---|---|---|---|---|---|---|
| | mem1 | mem4 | mem5 | mem6 | | | | |
| 1 | INTERNAL | INTERNAL | INTERNAL | INTERNAL | | | 1000,000 | 100 |
| 2 | INTERNAL | INTERNAL | INTERNAL | EXTERNAL | | | 800,000 | 110 |
| 3 | INTERNAL | INTERNAL | EXTERNAL | INTERNAL | | | 850,000 | 130 |
| 4 | INTERNAL | INTERNAL | EXTERNAL | EXTERNAL | | | 650,000 | 140 |
| ... | ... | ... | ... | ... | | | ... | ... |
| 13 | EXTERNAL | EXTERNAL | INTERNAL | INTERNAL | | | 8,000 | 700 |
| 14 | EXTERNAL | EXTERNAL | INTERNAL | EXTERNAL | | | 6,000 | 900 |
| 15 | EXTERNAL | EXTERNAL | EXTERNAL | INTERNAL | | | 7,000 | 800 |
| 16 | EXTERNAL | EXTERNAL | EXTERNAL | EXTERNAL | | | 5,000 | 1,000 |

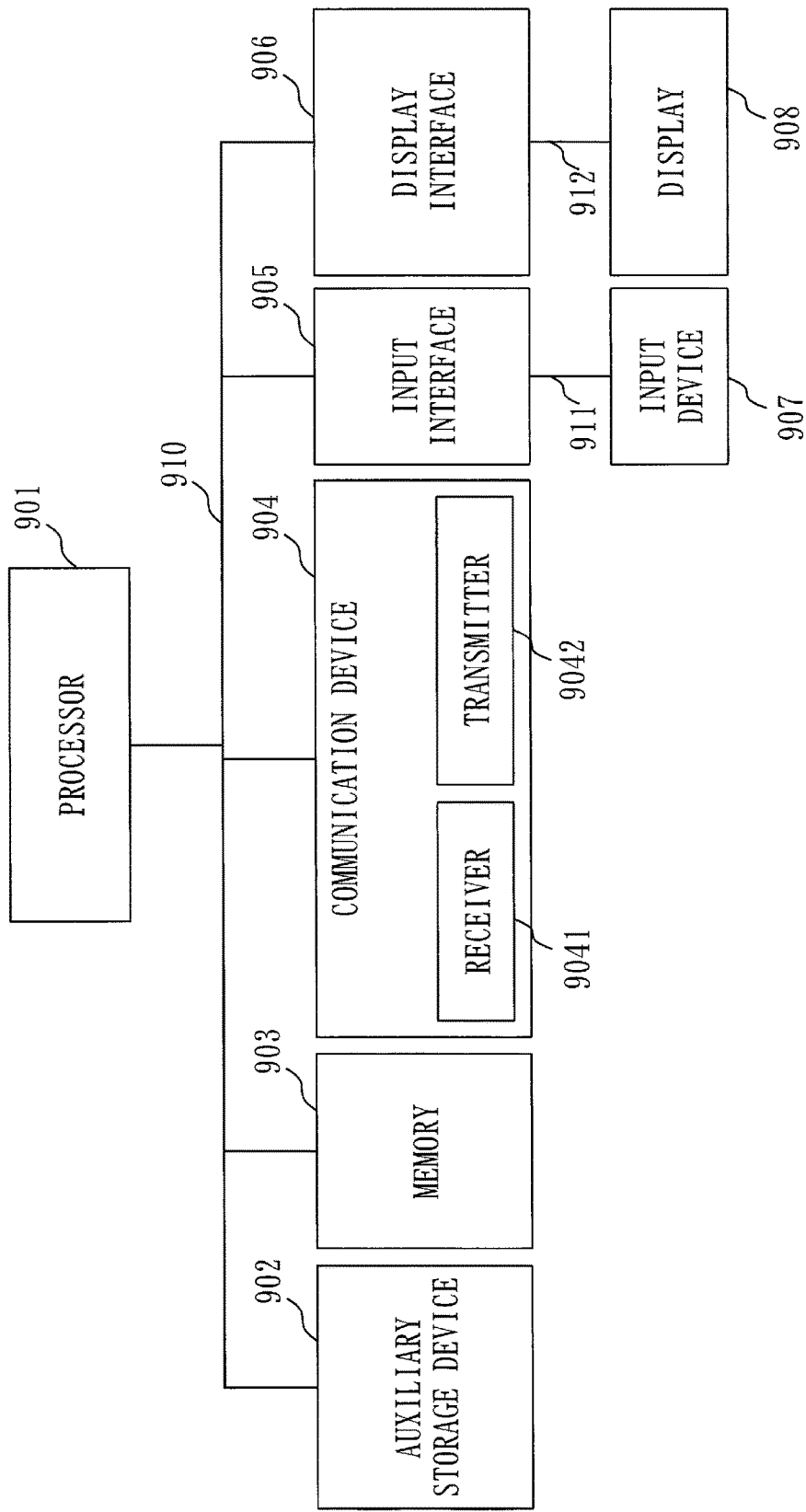

CIRCUIT DESIGN SUPPORT APPARATUS, CIRCUIT DESIGN SUPPORT METHOD, AND COMPUTER READABLE MEDIUM

TECHNICAL FIELD

The present invention relates to a technology for supporting circuit design.

BACKGROUND ART

For design of semiconductor integrated circuits (hereinafter also referred to as large scale integration (LSI)), there has been a technology of generating a register transfer level (RTL) describing behaviors of combined circuits of registers (flip-flops) by using a hardware description language.

In recent years, the circuit size of integrated circuits has been growing, and significant time is required for generation of the RTL.

Thus, a technology of automatically generating an RTL by using a high-level language such as the C language, the C++ language, and the System C language, which are more abstract than the RTL, has been proposed.

In addition, tools for generating an RTL from a high-level language are commercially available as high-level synthesis tools.

Behavioral description only describes the specification of behaviors but does not describe the specification on implementation.

Owing to general constraints in high-level synthesis, however, behavioral description may affect the implementation to be obtained as a result of the behavioral description depending on the manner in which the behavioral description is described.

For example, array variables in behavioral description are generally allocated to functional modules of a storage device such as a memory or a register (functional modules of a storage device will hereinafter be referred to as memory modules) in high-level synthesis.

Since an array variable is often described in a large size, an array variable is also allocated to a memory module of a large size in high-level synthesis.

Owing to the allocation to memory modules of large sizes in the high-level synthesis, a memory (hardware) having a large size may be allocated, which may increase the area of the LSI to be designed.

Typically, such a large memory is implemented by an external memory outside of the LSI to be designed.

With the current high-level synthesis tools, however, a specific memory module cannot be automatically allocated to an external memory.

Thus, in order to obtain an architecture in which a specific memory module is implemented by an external memory, the designer himself/herself needs to modify the behavioral description and describe a communication interface between the LSI and the external memory.

For example, Patent Literature 1 discloses a method of automatically generating a communication interface between an LSI and an external memory by providing the behavioral description created by the designer with configuration information of hardware to be designed (whether or not an external memory is present) and mapping information (specification of allocation of an array variable in the behavioral description to an external memory) without modifying the behavioral description by the designer.

CITATION LIST

Patent Literature

Patent Literature 1: JP 2008-204341 A

SUMMARY OF INVENTION

Technical Problem

In Patent Literature 1, however, the designer himeself/herself still needs to select to which memory an array variable in the behavioral description is to be allocated.

Thus, with the method of Patent Literature 1, the designer himself/herself has to select a memory module to which an external memory is to be allocated, which is not efficient.

A major object of the present invention is to solve such a problem as described above and to achieve a configuration capable of making circuit design procedures efficient.

Solution to Problem

A circuit design support apparatus according to the present invention, includes:

a binding data acquiring unit to acquire binding data describing a plurality of memory modules as functional modules of a design target circuit; and a memory module selecting unit to select an external memory module to be implemented as an external memory outside of the design target circuit from the memory modules described in the binding data on the basis of a constraint condition on the design target circuit.

Advantageous Effects of Invention

According to the present invention, the circuit design support apparatus selects a memory module to be implemented as an external memory, a designer need not consider a memory module to be implemented as the external memory, which makes circuit design procedures efficient.

BRIEF DESCRIPTION OF DRAWINGS

FIG. 4 is a table illustrating examples of constraint information according to the first embodiment.

FIG. 7 is a table illustrating an example of determination on external memory module candidates based on write data holding cycle time according to the first embodiment.

FIG. 11 is a table illustrating examples of external memory module candidates according to the first embodiment.

FIG. 12 is a table illustrating an example of procedures for selecting an external memory module according to the first embodiment.

FIG. 13 is a diagram illustrating an example hardware configuration of the circuit design support apparatus according to the first embodiment.

DESCRIPTION OF EMBODIMENTS

First Embodiment
*Description of Configuration*

Figure 1:
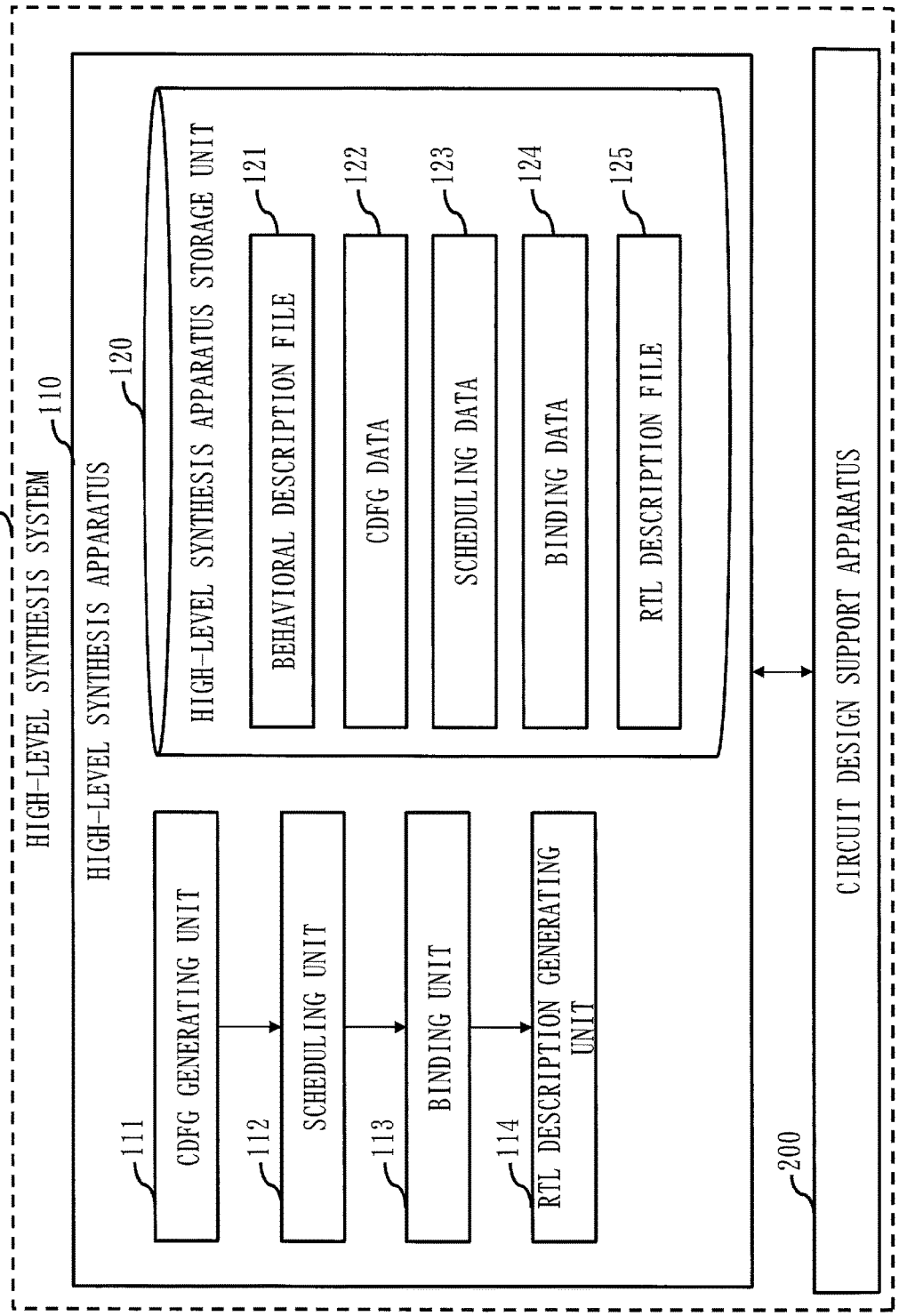
FIG. 1 is a diagram illustrating an example functional configuration of a high-level synthesis system according to a first embodiment.

FIG. 1 illustrates an example functional configuration of a high-level synthesis system 100 according to a first embodiment.

The functional configuration of the high-level synthesis system 100 in the first embodiment will be described on the basis of FIG. 1.

The high-level synthesis system 100, however, may have a configuration different from that of FIG. 1.

For example, a high-level synthesis apparatus 110 and a circuit design support apparatus 200 may be configured in one apparatus.

The high-level synthesis system 100 is a system for carrying out high-level synthesis for circuit design of semiconductor integrated circuits and the like.

Hereinafter, a circuit to be designed, which is subject to high-level synthesis in the high-level synthesis system 100, will be referred to as a design target circuit.

High-level synthesis is a technology for generating a register-transfer level (RTL) description describing operation of the design target circuit in the RTL from behavioral description describing behaviors of the design target circuit using a high-level language such as the C language, the C++ language, or the System C language.

The high-level synthesis system 100 includes a high-level synthesis apparatus 110 to carry out high-level synthesis, and a circuit design support apparatus 200 to support the high-level synthesis execution.

The high-level synthesis apparatus 110 includes a CDFG generating unit 111, a scheduling unit 112, a binding unit 113, an RTL description generating unit 114, and a high-level synthesis apparatus storage unit 120.

The CDFG generating unit 111 generates CDFG data 122 containing a control data flow graph (CDFG) from a behavioral description file 121 containing behavioral description of a design target circuit.

The CDFG indicates the operation order of a plurality of arithmetic operations performed by the design target circuit.

The CDFG includes a control flow graph (CFG) and a data flow graph (DFG).

The scheduling unit 112 generates scheduling data 123 on the basis of the CDFG data 122.

The scheduling data 123 is data indicating an execution time range of each of the arithmetic operations contained in the CDFG.

A method for generating the scheduling data 123 may be the same as a scheduling method in conventional high-level synthesis.

The binding unit 113 generates binding data 124 on the basis of the CDFG data 122 and the scheduling data 123.

The binding data 124 describes functional modules of the design target circuit.

The binding data 124 describes as the functional modules, a plurality of operation modules (operation resources) which are allocated to the respective arithmetic operations included in the CDFG.

The operation modules are arithmetic units, registers, and the like.

The binding data 124 also describes a plurality of memory modules, which are modules of a memory device used by the operation modules.

Details of the binding data 124 will be described below.

Note that a method for generating the binding data 124 may be the same as a binding method in the conventional high-level synthesis.

The RTL description generating unit 114 generates an RTL description file 125 indicating an RTL description on the basis of the CDFG data 122, the scheduling data 123, and the binding data 124.

A method for generating the RTL description file 125 may be the same as an RTL description generating method in the conventional high-level synthesis.

The high-level synthesis apparatus storage unit 120 stores data used, generated, input, and output by the high-level synthesis apparatus 110.

Specifically, the high-level synthesis apparatus storage unit 120 stores the behavioral description file 121, the CDFG data 122, the scheduling data 123, the binding data 124, and the RTL description file 125.

Figure 2:
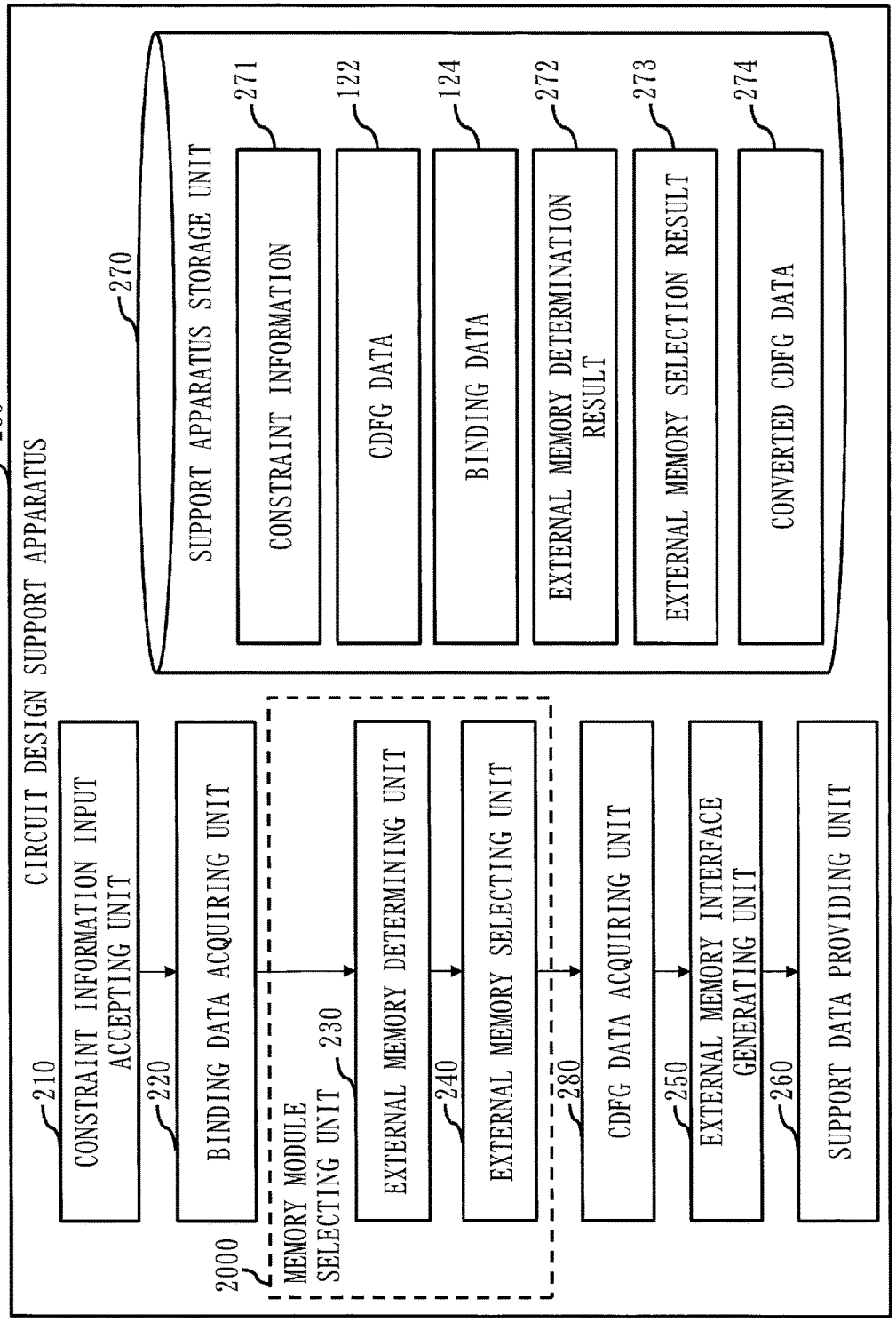
FIG. 2 is a diagram illustrating an example functional configuration of a circuit design support apparatus according to the first embodiment.

FIG. 2 illustrates an example functional configuration of the circuit design support apparatus 200 according to the first embodiment.

The functional configuration of the circuit design support apparatus 200 in the first embodiment will be described on the basis of FIG. 2.

The circuit design support apparatus 200 may have a functional configuration different from that of FIG. 2.

The circuit design support apparatus 200 includes a constraint information input accepting unit 210, a binding data acquiring unit 220, an external memory determining unit 230, an external memory selecting unit 240, a CDFG data acquiring unit 280, an external memory interface generating unit 250, a support data providing unit 260, and a support apparatus storage unit 270.

The constraint information input accepting unit 210 accepts constraint information 271 defining a constraint condition and the like on the design target circuit.

The constraint information 271 is input by a user using the circuit design support apparatus 200.

The binding data acquiring unit 220 acquires the binding data 124 from the high-level synthesis apparatus 110.

Note that a process performed by the binding data acquiring unit 220 corresponds to an example of a binding data acquiring process.

The external memory determining unit 230 analyzes a read cycle time and a write cycle time of a memory module on the basis of the constraint information 271 and the binding data 124.

The external memory determining unit 230 then extracts external memory module candidates that are candidates for an external memory module, which is a memory module to be implemented as an external memory being outside of the design target circuit.

The external memory determining unit 230 then generates an external memory determination result 272 indicating the extracted external memory module candidates.

The external memory selecting unit 240 searches for a memory architecture satisfying the constraint condition on the basis of the constraint information 271, the binding data 124, and the external memory determination result 272.

That is, the external memory selecting unit 240 selects a memory module that satisfies the constraint condition as the external memory module from the external memory module candidates.

More specifically, the external memory selecting unit 240 selects the external memory module from the external memory module candidates on the basis of at least either of a constraint condition on a circuit size and a constraint condition on latency.

The external memory selecting unit 240 then generates an external memory selection result 273 indicating the selected external memory module.

The external memory determining unit 230 and the external memory selecting unit 240 constitute a memory module selecting unit 2000.

In addition, processes performed by the external memory determining unit 230 and the external memory selecting unit 240 correspond to examples of a memory module selecting process.

The CDFG data acquiring unit 280 acquires the CDFG data 122 from the high-level synthesis apparatus 110.

The external memory interface generating unit 250 generates description of a module of a communication interface which is to be used by the design target circuit for communication with an external memory, on the basis of the external memory selection result 273.

The external memory interface generating unit 250 then generates converted CDFG data 274 by replacing the description of the memory module corresponding to the external memory module in the CDFG data 122 with the description of the module of the communication interface.

The support data providing unit 260 provides the converted CDFG data 274 to the high-level synthesis apparatus 110.

The scheduling unit 112 of the high-level synthesis apparatus 110 regenerates the scheduling data 123 on the basis of the provided converted CDFG data 274.

The binding unit 113 and the RTL description generating unit 114 then regenerates the binding data 124 and the RTL description file 125 on the basis of the regenerated scheduling data 123 and the converted CDFG data 274.

*Description of Operation*

Figure 3:
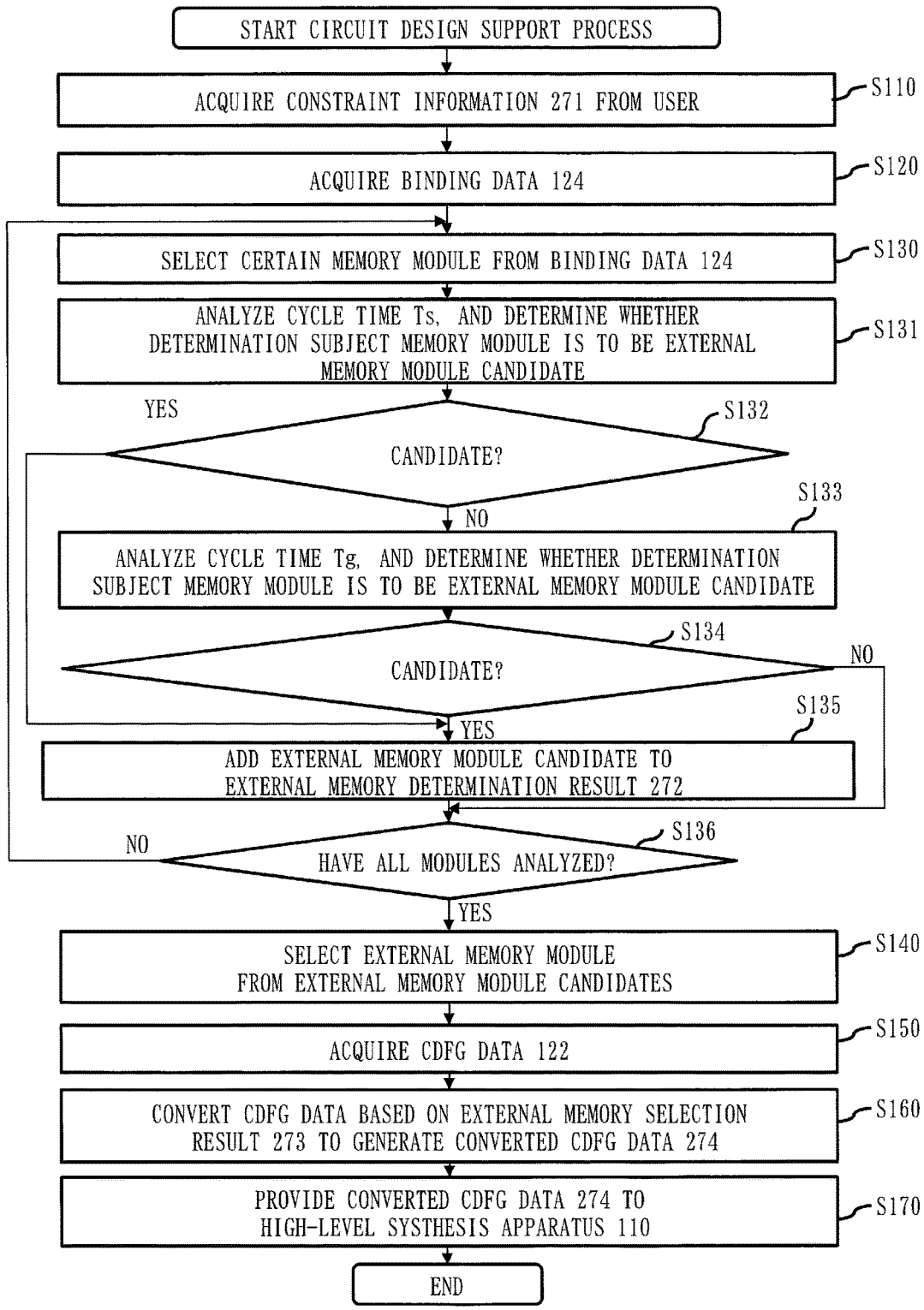
FIG. 3 is a flowchart illustrating example operation of the circuit design support apparatus according to the first embodiment.

FIG. 3 is a flowchart of a circuit design support process performed by the circuit design support apparatus 200 according to the first embodiment.

The circuit design support process performed by the circuit design support apparatus 200 in the first embodiment will be described on the basis of FIG. 3.

The circuit design support process may, however, be achieved by procedures different from those in FIG. 3.

Note that the circuit design support process illustrated in FIG. 3 corresponds to an example of a circuit design support method and a circuit design support program of the present application.

In S110, the constraint information input accepting unit 210 accepts the constraint information 271 necessary for operating the circuit design support apparatus 200 from the user, and stores the acquired (received) constraint information 271 in the support apparatus storage unit 270.

The constraint information defines the following five values:

(a) a cycle time threshold Tth for external memory determination;

(b) a latency constraint Lmax for external memory selection;

(c) a circuit size constraint Smax for external memory selection;

(d) optimization policy information P for external memory selection; and (e) external memory configuration information Minfo for external memory selection and external memory interface generation.

First, (a) the cycle time threshold Tth for external memory determination will be described.

The cycle time threshold Tth for external memory determination is a threshold that is a reference for extracting the external memory module candidates.

The cycle time threshold Tth for external memory determination is used in S132 and S134.

Hereinafter, the cycle time threshold Tth for external memory determination will also be simply referred to as a cycle time threshold Tth.

Next, (b) the latency constraint Lmax for external memory selection will be described.

The latency constraint Lmax for external memory selection is a constraint condition on the latency to be referred to at a time of selection of the external memory module from the external memory module candidates.

The external memory selecting unit 240 searches for a memory architecture satisfying the latency constraint Lmax for external memory selection.

The latency constraint Lmax for external memory selection is used in S140.

Hereinafter, the latency constraint Lmax for external memory selection will also be simply referred to as a latency constraint Lmax.

Next, (c) the circuit size constraint Smax for external memory selection will be described.

The circuit size constraint Smax for external memory selection is a constraint condition on the circuit size to be referred to at a time of selection of the external memory module from the external memory module candidates.

The external memory selecting unit 240 searches for a memory architecture satisfying the circuit size constraint Smax for external memory selection.

The circuit size constraint Smax for external memory selection is used in S140.

Hereinafter, the circuit size constraint Smax for external memory selection will also be simply referred to as a circuit size constraint Smax.

Next, (d) the optimization policy information P for external memory selection will be described.

The optimization policy information P for external memory selection is a guideline for optimization to be referred to at a time of selection of the external memory module from the external memory module candidates.

Circuit size optimization and latency optimization are selected as the optimization policy information P for external memory selection.

When the optimization policy information P for external memory selection is the circuit size optimization, the external memory selecting unit 240 searches for a memory architecture satisfying the latency constraint Lmax for external memory selection and the circuit size constraint Smax for external memory selection and minimizing the circuit size.

When the optimization policy information P for external memory selection is the latency optimization, the external memory selecting unit 240 searches for a memory architecture satisfying the latency constraint Lmax for external memory selection and the circuit size constraint Smax for external memory selection and minimizing the latency.

The optimization policy information P for external memory selection is used in S140.

Hereinafter, the optimization policy information P for external memory selection will also be simply referred to as optimization policy information P.

Next, (e) the external memory configuration information Minfo for external memory selection and external memory interface generation will be described.

The external memory configuration information Minfo for external memory selection and external memory interface generation is information indicating what hardware the external memory module selected in S135 is implemented.

For example, the external memory configuration information Minfo for external memory selection and external memory interface generation indicates the type of the external memory (such as a DRAM, a DDR-SDRAM, or a QDR-SDRAM), or the like.

The external memory configuration information Minfo for external memory selection and external memory interface generation is used in S140 and S160.

Hereinafter, the external memory configuration information Minfo for external memory selection and external memory interface generation will also be simply referred to as external memory configuration information Minfo.

The constraint information input accepting unit 210 acquires the constraint information 271 as illustrated in FIG. 4, for example.

After S110, the process proceeds to S120.

In S120, the binding data acquiring unit 220 of the circuit design support apparatus 200 acquires (receives) the binding data 124 generated by the binding unit 113 of the high-level synthesis apparatus 110 from the high-level synthesis apparatus 110.

After S120, the process proceeds to S130.

Figure 5:
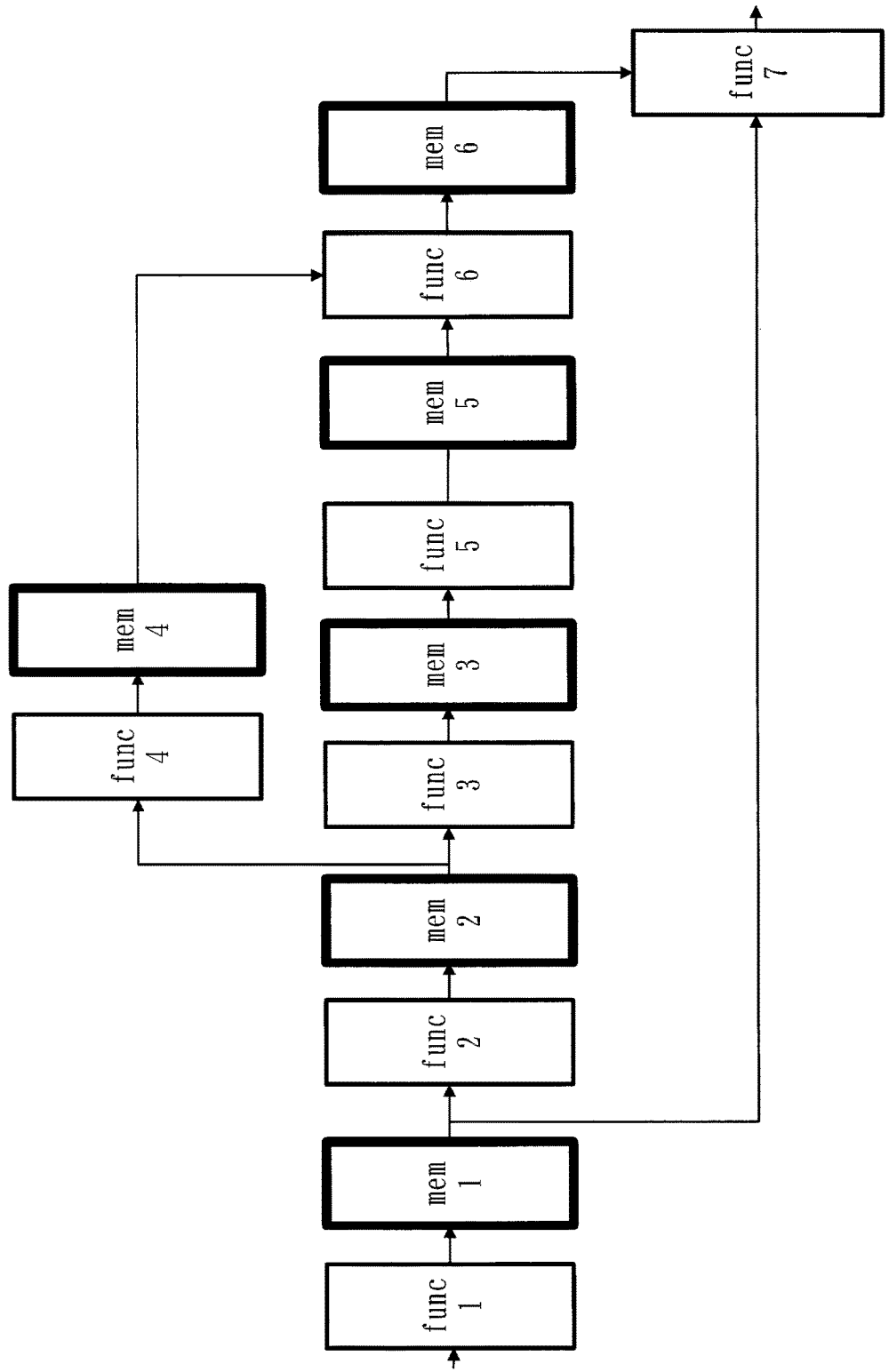
FIG. 5 is a diagram illustrating an example of binding data according to the first embodiment.

FIG. 5 is a diagram illustrating an example of the binding data 124 according to the first embodiment.

The first embodiment will be described on the basis of the binding data illustrated in FIG. 5.

As illustrated in FIG. 5, the binding data describe a plurality of functional modules included in the design target circuit.

Quadrangles with "func" written therein in FIG. 5 are operation modules of the design target circuit.

The operation modules refer to an arithmetic unit which performs an arithmetic operation and a resistor, as mentioned above.

Quadrangles with "mem" written therein in FIG. 5 are memory modules of the design target circuit.

The memory modules refer to memory devices as mentioned above.

Arrows in FIG. 5 indicate the flow of data.

The binding data indicate to which memory module each operation module performs read access (from which memory data is to be read) and to which memory module each operation module performs write access (in which memory an operation result is to be stored).

In addition, although not illustrated in FIG. 5, the binding data describes the timing (cycle time) of read access occurring in each memory module and an operating block (read access operating block) to perform the read access, and the timing (cycle time) of write access and an operating block (referred to as a write access operating block) to perform the write access.

In the present embodiment, the binding data acquiring unit 220 acquires the binding data 124 of FIG. 5.

The description refers back to FIG. 3, and continues from S130.

In S130, the external memory determining unit 230 selects a certain memory module from a plurality of memory modules described in the binding data 124.

Hereinafter, the memory module selected in S130 will be referred to as a determination subject memory module.

After S130, the process proceeds to S131.

In S131, the external memory determining unit 230 analyzes the life cycle of the determination subject memory module to acquire the following two cycle times:

(1) a cycle time when write access is terminated for the determination subject memory module; and (2) a cycle time when the last read access to write data is started for the determination subject memory module.

Subsequently, the external memory determining unit 230 calculates "the cycle time of (1)—the cycle time of (2)" to obtain a write data holding cycle time Ts of the determination subject memory module.

As indicated by the expression above, the write data holding cycle time Ts is time from termination of write access to a memory module until start of the last read access to write data having been written in the memory module by the write access.

After S131, the process proceeds to S132.

In S132, the external memory determining unit 230 compares the write data holding cycle time Ts of the determination subject memory module obtained in S131 with the cycle time threshold Tth for external memory determination in the constraint information 271, to determine whether or not the determination subject memory module is to be an external memory module candidate.

If Ts≥Tth, the external memory determining unit 230 determines the determination subject memory module to be an external memory module candidate (YES), and the process proceeds to S135.

If Ts<Tth, the external memory determining unit 230 does not determine the determination subject memory module to be an external memory module candidate (NO), and the process proceeds to S133.

Figure 6:
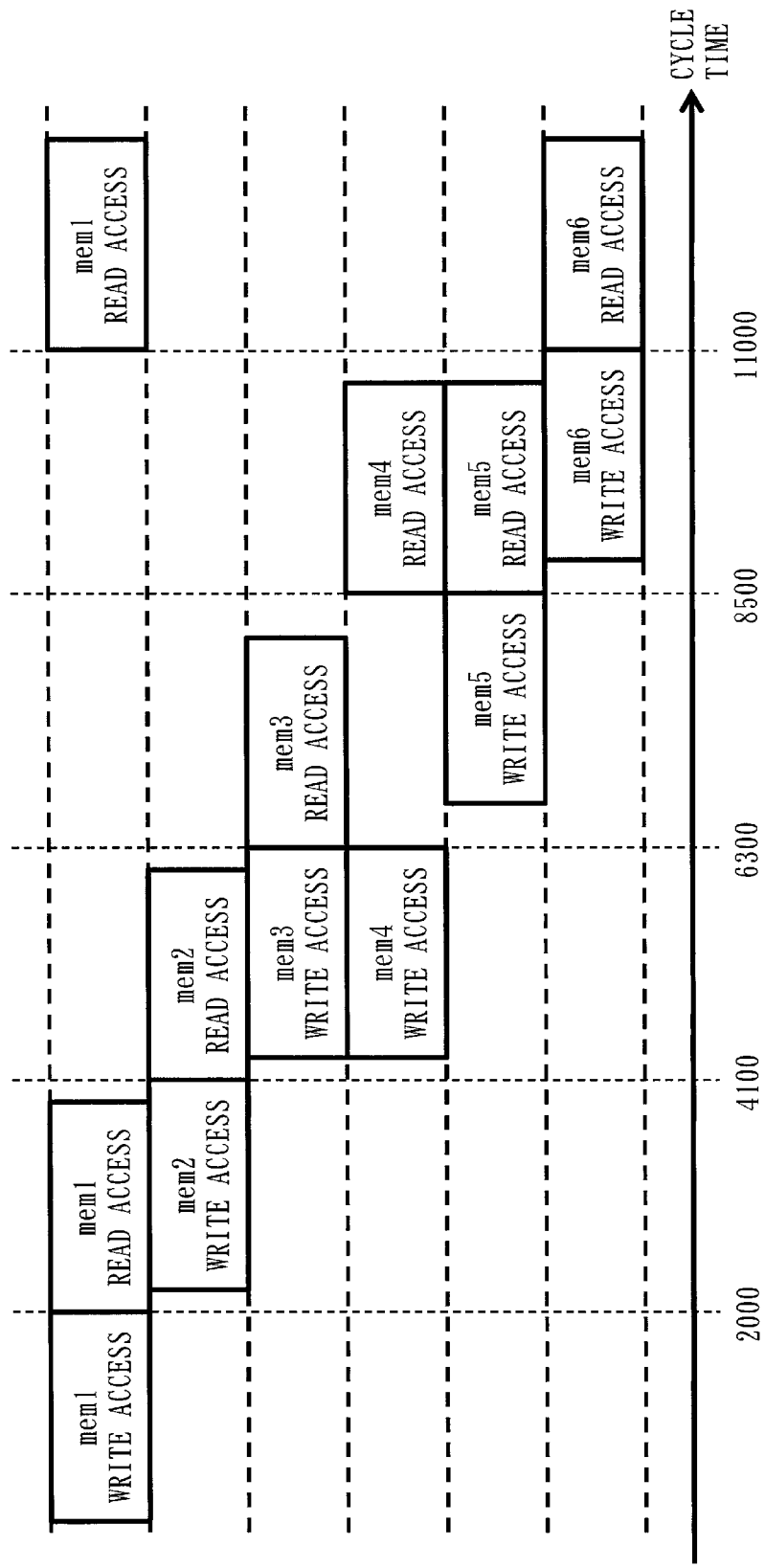
FIG. 6 is a chart illustrating examples of write access timing and read access timing according to the first embodiment.

FIG. 6 illustrates an example of a life time cycle analysis result of each memory module according to the first embodiment.

FIG. 7 illustrates an example of determination result on extraction of external memory module candidates based on the life time cycle analysis result of each memory module according to the first embodiment.

Specific examples of S131 and S132 will be explained on the basis of FIGS. 6 and 7.

FIG. 6 illustrates a result of analysis of write access cycle time and read access cycle time for each memory module in the binding data 124.

On the basis of the analysis result, the external memory determining unit 230 acquires, for each memory module, the cycle time when write access is terminated and the cycle time when the last read access to write data is started.

FIG. 7 illustrates the cycle time when write access is terminated and the cycle time when the last read access to write data is started acquired for each memory module by the external memory determining unit 230 from FIG. 6.

In addition, the external memory determining unit 230 calculates, for each memory module holding cycle time Ts of write data, and compares Ts with Tth to determine whether or not each memory module is to be an external memory module candidate.

Tth is 1500 as illustrated in FIG. 4, Ts of mem1 is 9000 and Ts of mem4 is 2200 as illustrated in FIG. 7.

Thus, since Ts >Tth is satisfied for mem1 and mem4, mem1 and mem4 are extracted as external memory module candidates in the example of FIG. 7.

With the binding data of FIG. 5 and the cycle times of FIG. 6, if calculation results of func1 are accumulated in an external memory and data is acquired from the external memory at the start of operation of func7, mem1 need not be included as an internal memory in the design target circuit.

Thus, mem1 is extracted as an external memory module candidate.

Since mem4 need not be included as an internal memory in the design target circuit, either, for a similar thought, mem4 is extracted as an external memory module candidate.

Since, however, mem1 is also used by func2, a small-capacity internal memory needs to be implemented separately. This will be described below.

The description refers back to FIG. 3, and continues from S133.

The external memory determining unit 230 applies a criterion of "whether data necessary for starting operations of operation modules requiring the determination subject memory module will be completely obtained in the cycle time not longer than the threshold Tth" to a determination subject memory module determined not to be an external memory module candidate as a result of S132.

In other words, the external memory determining unit 230 determines whether or not a determination subject memory module is to be an external memory module candidate on the basis of the criterion described above.

In S133, the external memory determining unit 230 analyzes the determination subject memory module to acquire the following two pieces of information:

(1) data stored in the determination subject memory module necessary for one iteration of a function requiring the determination subject memory module; and (2) a cycle time Tg necessary for obtaining complete data of (1).

After the two pieces of information are acquired, the process proceeds to S134.

In S134, the external memory determining unit 230 compares the cycle time Tg obtained in S133 with the cycle time threshold Tth at a time of the external memory determination in the constraint information 271, to determine whether or not the determination subject memory module is to be extracted as the external memory module candidate.

If Tg≥Tth, the determination subject memory module is determined to be the external memory module candidate (YES), and the process proceeds to S135.

If Tg<Tth, the determination subject memory module is determined to be a candidate for an internal memory module to be implemented as an internal memory (NO), and the process proceeds to S136.

Figure 8:
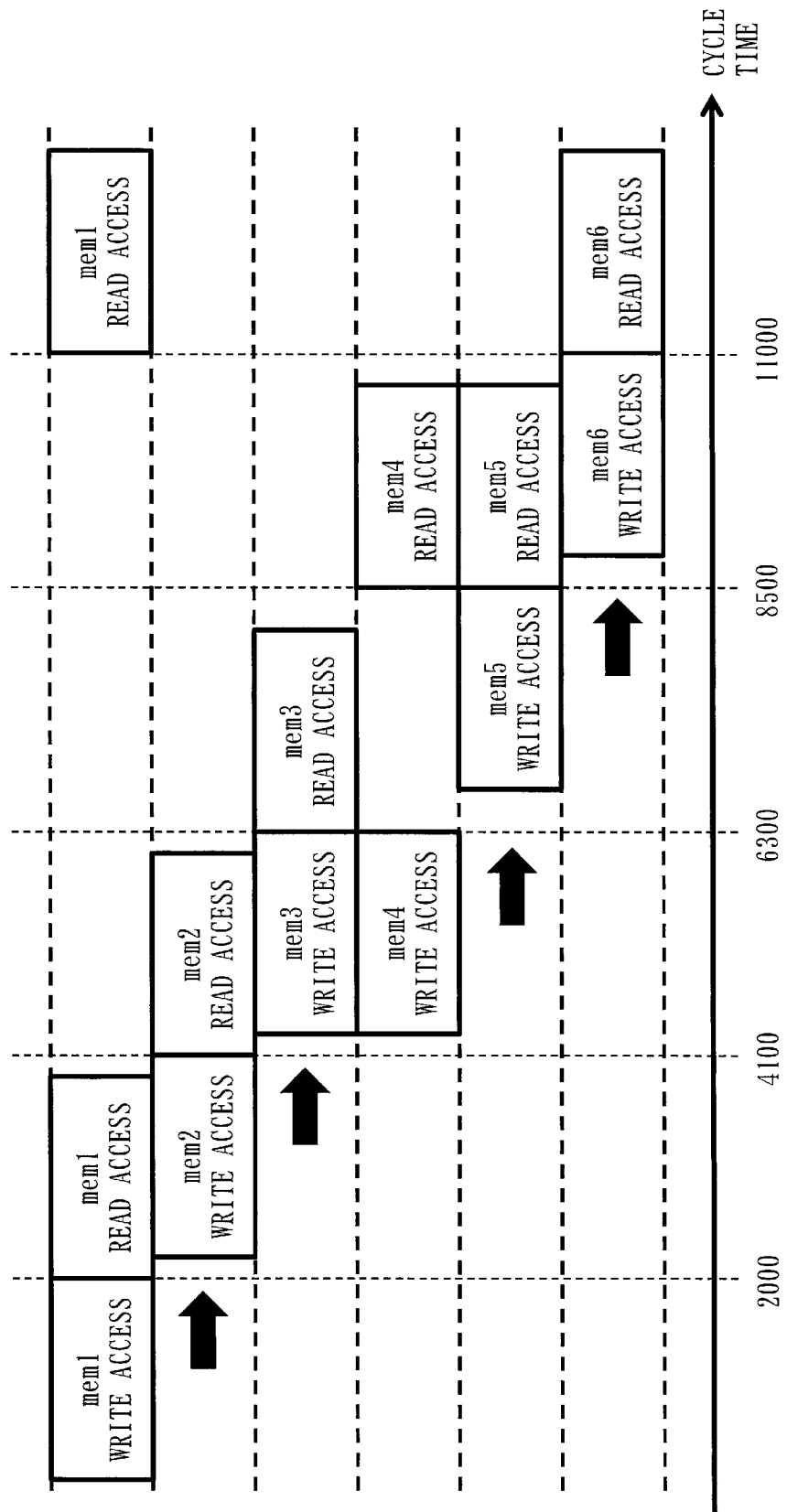
FIG. 8 is a chart illustrating an example of memory modules that are subjects of a process of determining external memory candidates based on read access waiting time according to the first embodiment.

FIG. 8 is a chart illustrating an example of memory modules that are subjects of the external memory determination in S133.

In FIG. 8, the memory modules other than mem1 and mem4 (the memory modules indicated by arrows) are the memory modules that are subjects of the external memory determination in S133.

Figure 9:
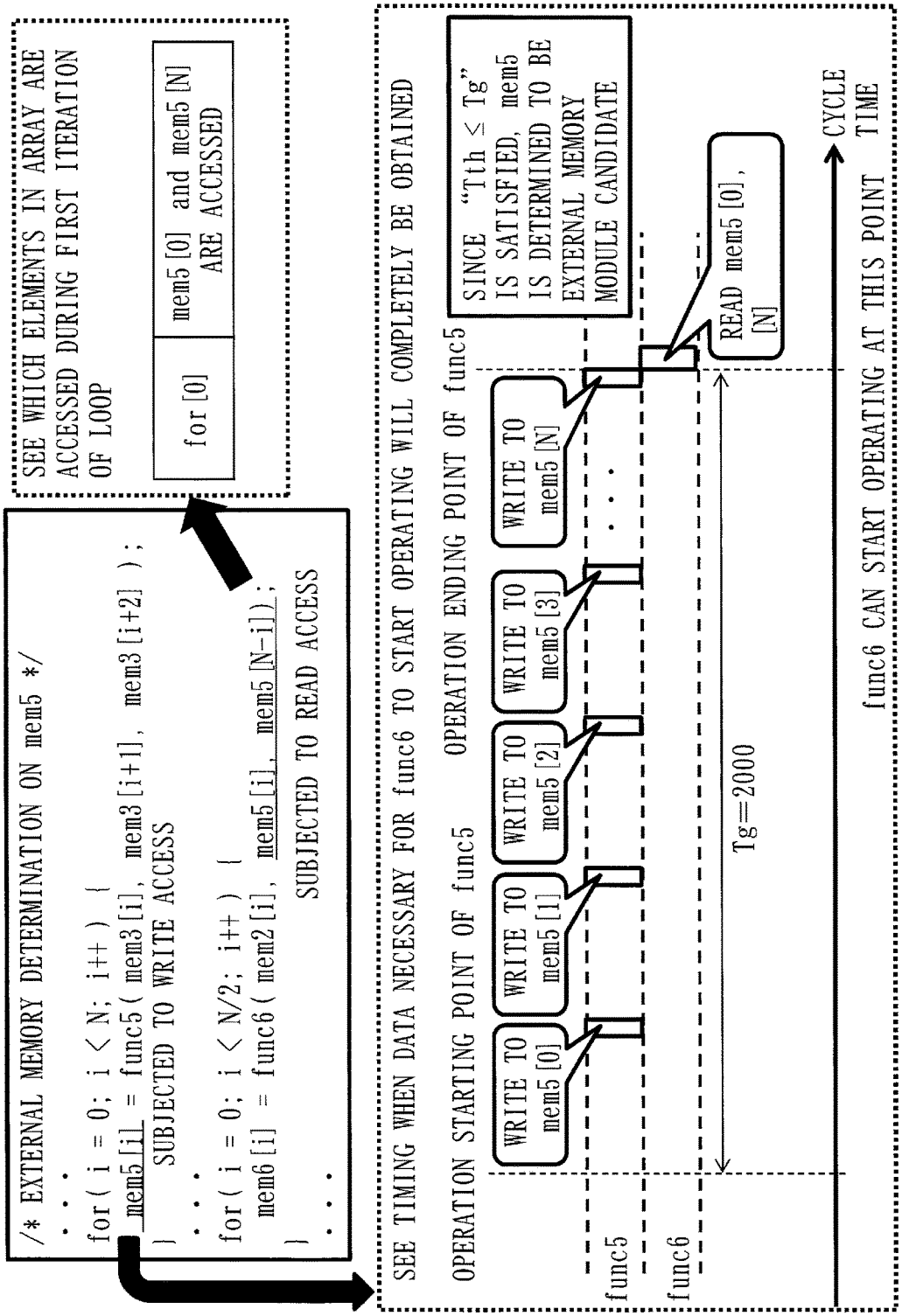
FIG. 9 is a diagram illustrating an example of determination on an external memory module candidate on the basis of a read access waiting time according to the first embodiment.

FIG. 9 illustrates an example of determination of an external memory module candidate on mem5.

Figure 10:
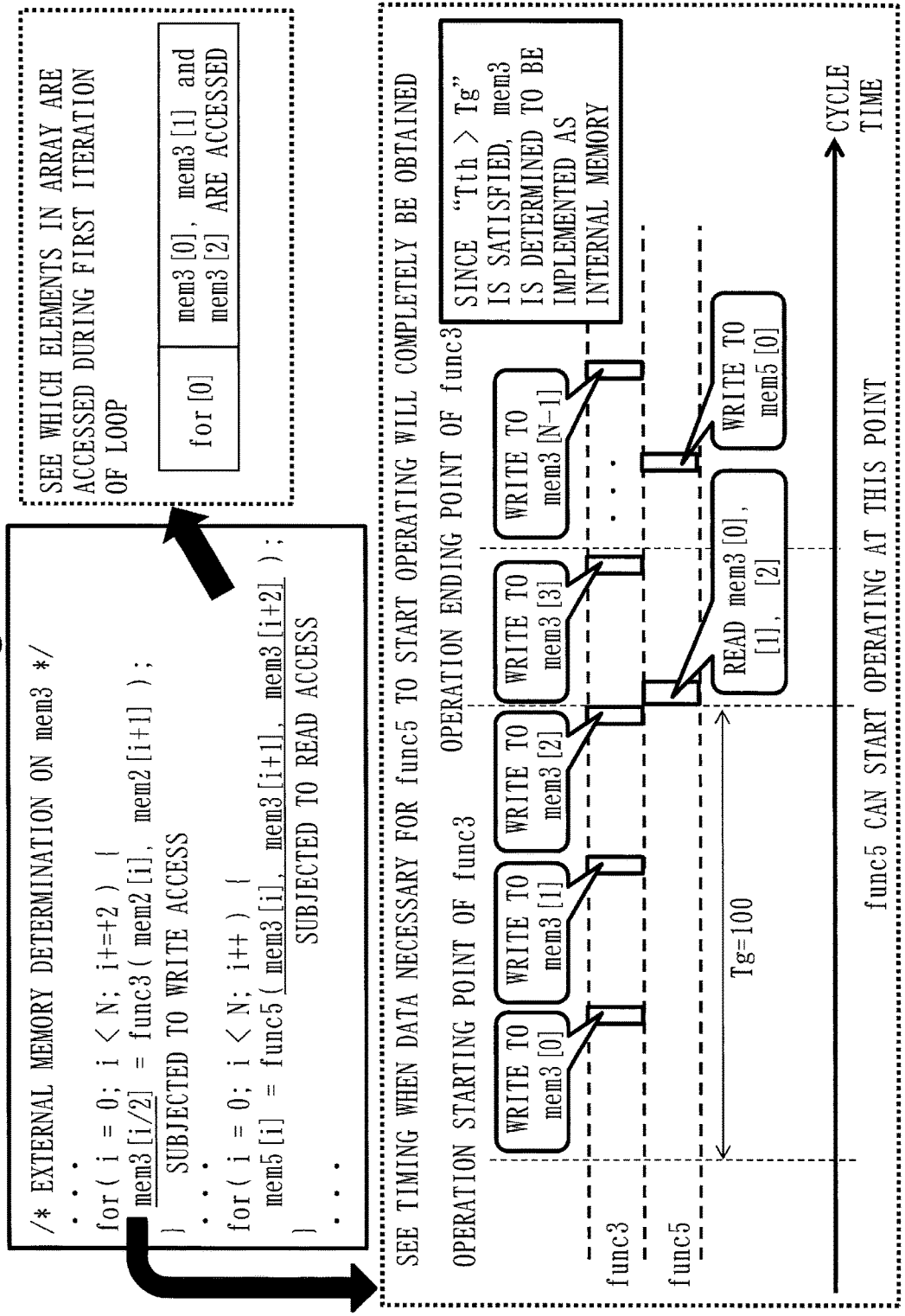
FIG. 10 is a diagram illustrating an example of determination on an external memory module candidate on the basis of a read access waiting time according to the first embodiment.

FIG. 10 illustrates an example of determination of an external memory module candidate on mem3.

Specific examples of S131 and S132 will be explained on the basis of FIGS. 8, 9, and 10.

In S131 and S132, mem1 and mem4 are already determined to be external memory module candidates.

Thus, as illustrated in FIG. 8, mem2, mem3, mem5, and mem6 are subjects of the external memory determination in S133 and S134.

FIG. 9 illustrates a result of determination on whether or not mem5 is an external memory module candidate.

First, the external memory determining unit 230 extracts read access to mem5.

If mem5 is read in a loop as a result of the extraction, the external memory determining unit 230 analyzes which elements of mem5 are accessed in the first iteration of the loop.

In the example of FIG. 9, since i=0 at the first iteration of the loop, mem5[0] and mem5[N] are accessed according to mem5[i] and mem5[N-i].

Thus, if data of mem5[0] and mem5[N] are completely obtained, func6 can start operating.

Subsequently, the external memory determining unit 230 extracts write access to mem5.

The external memory determining unit 230 then calculates the timing when mem5[0] and mem5[N] will completely be obtained.

In the example of FIG. 9, func6 cannot start operating until write access to mem5[N] occurs, that is, until the operation of func5 is terminated.

In the example of FIG. 9, the cycle time Tg from when func5 starts operating until when func6 is enabled to start operating (until write access to mem5[N] occurs) is 2000.

Thus, "Tg≥Tth" is satisfied, and mem5 is determined to be the external memory module candidate.

With the binding data of FIG. 5 and the cycle times of FIG. 6, if calculation results of func5 are accumulated in an external memory and data is acquired from the external memory at the start of operation of func6, mem5 need not be included as an internal memory in the design target circuit.

Thus, mem5 is extracted as an external memory module candidate.

FIG. 10 illustrates a result of determination on whether or not mem3 is an external memory module candidate.

First, the external memory determining unit 230 extracts read access to mem3.

If mem3 is read in a loop as a result of the extraction, the external memory determining unit 230 analyzes which elements of mem3 are accessed in the first iteration of the loop.

In the example of FIG. 10, since i=0 at the first iteration of the loop, mem3[0], mem3[1], and mem3[2] are accessed according to mem3[i], mem3[i+1], and mem3 [i+2].

Thus, if data of mem3[0], mem3[1], and mem3[2] are completely obtained, func5 can start operating.

Subsequently, the external memory determining unit 230 extracts write access to mem3.

The external memory determining unit 230 then calculates the timing when mem3[0], mem3[1], and mem3[2] are completely obtained.

In the example of FIG. 10, func5 cannot start operating until write access to mem3[2] occurs.

Since, however, data is written to mem3[2] without waiting to termination of the operation of func3, func5 can be started to operate.

In the example of FIG. 10, the cycle time Tg from when func3 starts operating until when func5 is enabled to start operating (until write access to mem3 [2] occurs) is 100.

Thus, "Tg<Tth" is satisfied, and mem3 is determined to be implemented by the internal memory.

As described above, the external memory determining unit 230 analyzes, for each memory module, the timing of write access and an operating block (write access operating block) to perform the write access, and the timing of read access and an operating block (read access operating block) to perform the read access, which are described in the binding data 124.

The external memory determining unit 230 also calculates read access waiting time (the cycle time Tg in FIG. 9, for example), which is the time from when the write access operating block (func5 in FIG. 9, for example) to perform write access of operand data to be used by the read access operating block (func6 in FIG. 9, for example) for arithmetic operation starts operating until when the read access operating block (func6 in FIG. 9, for example) is enabled to start read access to the operand data.

The external memory determining unit 230 then extracts a memory module (mem5 in FIG. 9, for example) where the calculated read access waiting time is not shorter than the threshold as the external memory module candidate.

The description refers back to FIG. 3, and continues from S135.

If the determination subject memory module selected in S131 is determined to be the external memory module candidate as a result of S132 and S134, the external memory determining unit 230 writes information on the determination subject memory module in the external memory determination result 272 in S135.

After S135, the process proceeds to S136.

In S136, the external memory determining unit 230 checks whether or not all the memory modules in the binding data 124 have been analyzed.

If there is an unanalyzed memory module (NO), the process returns to S130.

If all the memory modules have been analyzed (YES), the process proceeds to S140.

In S140, the external memory selecting unit 240 selects an external memory module from the external memory module candidates in the external memory determination result 272 on the basis of the constraint information 271.

After S140, the process proceeds to S150.

FIG. 11 illustrates an example of the external memory determination result 272 according to the first embodiment.

FIG. 12 illustrates an example of a memory architecture search result according to the first embodiment.

A specific example of S140 will be explained on the basis of FIGS. 11 and 12.

FIG. 11 illustrates a list of memory modules determined to be external memory module candidates as a result of the external memory module determination performed by the external memory determining unit 230 on the memory modules described in the binding data 124.

In the example of FIG. 11, mem1, mem4, mem5, and mem6 are the external memory module candidates.

Thus, the external memory selecting unit 240 searches for a memory module to be the external memory module from mem1, mem4, mem5, and mem6.

Generally, when a memory inside an LSI is replaced by an external memory, so that a memory can be excluded from the LSI, which makes the circuit size of the LSI smaller.

The cycle time required to acquire data from an external memory is longer than that for acquiring data from a memory inside the LSI.

Thus, replacement of an LSI internal memory with an external memory involves a trade-off between the circuit size and the processing latency.

Thus, implementing all the memories determined to be the external memory module candidates as illustrated in FIG. 11 as the external memories is not always an optimum solution.

A search to determine which memory module among the memory modules determined to be the external memory module candidates illustrated in FIG. 11 is to be implemented as the external memory is therefore necessary.

In the present embodiment, the external memory selecting unit 240 generates all the combinations of a plurality of external memory module candidates.

The external memory selecting unit 240 then calculates, for each combination of external memory module candidates, the circuit size and the latency of a case where the external memory module candidates included in the combination are implemented as the external memories on the basis of the binding data 124.

Furthermore, the external memory selecting unit 240 selects a combination from the plurality of combinations of external memory module candidates on the basis of the calculated circuit sizes and latencies, and selects the external memory module candidates included in the selected combination as the external memory modules.

More specifically, the external memory selecting unit 240 selects a combination, whose calculated circuit size satisifies the constraint condition on the circuit size and whose calculated latency satisifies the constraint condition on the latency, from the plurality of combinations of external memory module candidates.

If there are a plurality of combinations whose calculated circuit sizes satisfy the constraint condition on the circuit size and whose calculated latencies satisfy the constraint condition on the latency, the external memory selecting unit 240 selects a combination with the smallest calculated circuit size.

Alternatively, the external memory selecting unit 240 may select a combination with the shortest calculated latency.

FIG. 12 illustrates the circuit size and the latency of each combination of external memory module candidates calculated by the external memory selecting unit 240.

The circuit size of the entire LSI in FIG. 12 refers to a circuit size that is a sum of the circuit size of the design target circuit in a case where a certain memory module from a plurality of memory modules is implemented as the external memory and the circuit size of peripheral circuits.

In addition, the processing latency of the entire LSI in FIG. 12 refers to processing latency occurring at the design target circuit in a case where a certain memory module from a plurality of memory modules is implemented as the external memory.

Specifically, the circuit size of the entire LSI is calculated as follows:

the circuit size of the entire LSI
=the circuit size of the design target circuit in a case where all the memory modules are internal memories
−the circuit size of memory modules to be the external memories
+the circuit size of the communication interfaces with the external memories.

Thus, the external memory selecting unit 240 obtains these three circuit sizes, and performs the above calculation using the three circuit sizes.

The first "circuit size of the design target circuit in a case where all the memory modules are internal memories" is a circuit size of the design target circuit when all the memory modules described in the binding data 124 are implemented as internal memories in the design target circuit.

The second "circuit size of memory modules to be external memories" is a circuit size of the external memories when certain external memory module candidates included in the combination are implemented as the external memories.

The third "circuit size of the communication interfaces with external memories" is a circuit size of the communication interfaces used by the design target circuit for communication with external memories when certain external memory module candidates included in the combination are implemented as the external memories.

Specifically, the processing latency of the entire LSI is calculated as follows:
the processing latency of the entire LSI
=the processing latency of the design target circuit in a case where all the memory modules are internal memories
+the processing latency when data are acquired from external memories.

Thus, the external memory selecting unit 240 obtains these two processing latencies, and performs the above calculation using the two processing latencies.

The first "processing latency of the design target circuit in a case where all the memory modules are internal memories" is latency occurring when all the memory modules described in the binding data are implemented as the internal memories in the design target circuit, and corresponds to a first latency.

The second "processing latency when data are acquired from external memories" is latency required for the design target circuit to acquire data from the external memories when certain external memory module candidates included in the combination are implemented as the external memories, and corresponds to a second latency.

Note that the external memory selecting unit 240 calculates the cycle time required to acquire data from the external memory on the basis of the external memory configuration information Minfo.

In the example of FIG. 4, since the external memory is a DDR_SDRAM, the cycle time required to acquire data from the external memory is calculated based on this.

The external memory selecting unit 240 selects a combination that satisfies the conditions, from the result in FIG. 12, on the basis of the latency constraint Lmax, the circuit size constraint Smax and the optimization policy information P in the constraint information 271.

In the example of FIG. 4, since the optimization policy information P is priority to the circuit size, the external memory selecting unit 240 selects a memory architecture (a combination of external memory modules) satisfying the latency constraint Lmax and the circuit size constraint Smax and minimizing the circuit size.

The external memory selecting unit 240 then generates an external memory selection result 273 describing the selection result.

The description refers back to FIG. 3 and continues from S150.

In S150, the CDFG data acquiring unit 280 of the circuit design support apparatus 200 acquires (receives) from the high-level synthesis apparatus 110, the CDFG data 122 generated by the CDFG generating unit 111 of the high-level synthesis apparatus 110.

After S150, the process proceeds to S160.

In S160, the external memory interface generating unit 250 of the circuit design support apparatus 200 automatically generates an external memory interface on the basis of the external memory selection result 273.

The external memory interface generating unit 250 converts the description of the memory module selected to be the external memory module in the CDFG data 122 into description of the automatically generated external interface, to generate the converted CDFG data 274.

For example, the external memory interface generating unit 250 generates the converted CDFG data 274 by using an interface generating apparatus disclosed in Patent Literature 1 or the like.

After S160, the process proceeds to S170.

In S170, the support data providing unit 260 provides (transmits) the converted CDFG data 274 to the high-level synthesis apparatus 110.

The scheduling unit 112, the binding unit 113, and the RTL description generating unit 114 of the high-level synthesis apparatus 110 then generate the scheduling data 123, the binding data 124, and the RTL description file 125 on the basis of the provided converted CDFG data 274.

\*\*\*Description of Effects of Embodiment\*\*\*

As described above, in the present embodiment, there exists an effect that the circuit design support apparatus is capable of extracting memory modules to be implemented as external memories from memory modules that are functional modules of the storage device (memory) in behavioral description, and automatically generating by high-level synthesis a circuit necessary when the memory modules are implemented as the external memories.

\*\*\*Summary\*\*\*

The present embodiment above describes a circuit design support apparatus that receives behavioral description, performs a high-level synthesis (behavioral synthesis) process, and outputs an RTL description, the circuit design support apparatus including: an external memory determining unit to calculate a holding cycle time of write data of each memory module and a cycle time required until data necessary to start operating each function requiring each memory module are completely obtained, from a binding result that is a result of the high-level synthesis, and determine whether each memory module is to be an external memory; an external memory selecting unit to search for a memory architecture satisfying a constraint condition from the memory modules that are external memory module candidates; and an external memory interface generating unit to automatically generate a communication interface with an external memory from a result of selection of the external memory selecting unit.

In addition, the present embodiment above describes a circuit design support method for receiving behavioral description, performing a high-level synthesis (behavioral synthesis) process, and outputting an RTL description, the circuit design support method including: an external memory determining process of calculating a holding cycle time of write data of each memory module and a cycle time required until data necessary to start operating each function requiring each memory module are completely obtained, from a binding result that is a result of the high-level synthesis, and determining whether each memory module is to be an external memory; an external memory selecting process of searching for a memory architecture satisfying a constraint condition from the memory modules that are external memory module candidates; and an external memory interface generating process of automatically generating a communication interface with an external memory from a result of selection of the external memory selecting process.

*Description of Hardware Configuration*

Finally, an example hardware configuration of the circuit design support apparatus 200 will be described with reference to FIG. 13.

The circuit design support apparatus 200 is a computer.

The circuit design support apparatus 200 includes hardware such as a processor 901, an auxiliary storage device 902, a memory 903, a communication device 904, an input interface 905, and a display interface 906.

The processor 901 is connected to other hardware via a signal line 910, and controls these hardware.

The input interface 905 is connected to an input device 907.

The display interface 906 is connected to a display 908.

The processor 901 is an integrated circuit (IC) to perform processing.

The processor 901 is, for example, a central processing unit (CPU), a digital signal processor (DSP), or a graphics processing unit (GPU).

The auxiliary storage device 902 is a read only memory (ROM), a flash memory, or a hard disk drive (HDD), for example.

The memory 903 is, for example, a random access memory (RAM).

The communication device 904 includes a receiver 9041 to receive data, and a transmitter 9042 to transmit data.

The communication device 904 is a communication chip or a network interface card (NIC), for example.

The input interface 905 is a port to which a cable 911 of the input device 907 is connected.

The input interface 905 is a universal serial bus (USB) terminal, for example.

The display interface 906 is a port to which a cable 912 of the display 908 is connected.

The display interface 906 is an USB terminal or a high definition multimedia (HDMI: registered trademark) terminal, for example.

The input device 907 is a mouse, a keyboard, or a touch panel, for example.

The display 908 is, for example, a liquid crystal display (LCD).

The auxiliary storage device 902 stores programs to implement the functions of the constraint information input accepting unit 210, the binding data acquiring unit 220, the external memory determining unit 230, the external memory selecting unit 240, the external memory interface generating unit 250, the support data providing unit 260, and the CDFG data acquiring unit 280 (which will be collectively referred to as "units") illustrated in FIG. 2.

The programs are loaded into the memory 903, read by the processor 901, and executed by the processor 901.

Furthermore, the auxiliary storage device 902 also stores an operating system (OS).

At least part of the OS is loaded into the memory 903, and the processor 901 executes the programs to implement the functions of the "units" while executing the OS.

While one processor 901 is illustrated in FIG. 13, the circuit design support apparatus 200 may include a plurality of processors 901.

The plurality of processors 901 may then execute the programs to implement the functions of the "units" in cooperation with one another.

Furthermore, information, data, signal values, and variable values representing results of processing performed by the "units" are stored in the memory 903, the auxiliary storage device 902, or a register or a cache memory in the processor 901.

The "units" may alternatively be provided in the form of "circuitry."

Alternatively, a "unit" may be read as a "circuit," a "step," a "procedure," or a "process."

The "circuit" and "circuitry" are concepts including not only the processor 901 but also other types of processing circuits such as a logic IC, a gate array (GA), an application specific integrated circuit (ASIC), and a field-programmable gate array (FPGA).

REFERENCE SIGNS LIST

100: high-level synthesis system, 110: high-level synthesis apparatus, 111: CDFG generating unit, 112: scheduling unit, 113: binding unit, 114: RTL description generating unit, 120: high-level synthesis apparatus storage, 121: behavioral description file, 122: CDFG data, 123: scheduling data, 124: binding data, 125: RTL description file, 200: circuit design support apparatus, 210: constraint information input accepting unit, 220: binding data acquiring unit, 230: external memory determining unit, 240: external memory selecting unit, 250: external memory interface generating unit, 260: support data providing unit, 270: support apparatus storage unit, 271: constraint information, 272: external memory determination result, 273: external memory selection result, 274: converted CDFG data, 280: CDFG data acquiring unit, 2000: memory module selecting unit

The invention claimed is:

1. A circuit design support apparatus comprising:
processing circuitry to:
acquire binding data describing a plurality of memory modules as functional modules of a design target circuit and describing, for each of the memory modules, timing of write access and timing of read access to the memory module; and
analyze, for each of the memory modules, the timing of write access and the timing of read access described in the binding data, extract an external memory module candidate that is a candidate for an external memory module to be implemented as an external memory outside of the design target circuit from the memory modules described in the binding data, and select the external memory module from the extracted external memory module candidate on the basis of a constraint condition on the design target circuit.

2. The circuit design support apparatus according to claim 1, wherein
the processing circuitry acquires binding data describing the memory modules and a plurality of operating blocks to perform arithmetic operations, as functional modules of the design target circuit, and
when a plurality of external memory module candidates are extracted, the the processing circuitry
generates a plurality of combinations of external memory module candidates,
calculates, for each of the combinations of external memory module candidates, a circuit size and latency in a case where the external memory module candidates included in the combination are implemented as the external memories, on the basis of the binding data, selects a combination from the combinations of external module candidate, on the basis of the calculated circuit sizes and latencies, and selects the external memory module candidates included in the selected combination as the external memory modules.

3. The circuit design support apparatus according to claim 2, wherein the processing circuitry selects a combination whose calculated circuit size satisifies a constraint condition on a circuit size and whose calculated latency satisifies a constraint condition on latency from the combinations of external memory module candidates.

4. The circuit design support apparatus according to claim 3, wherein the processing circuitry selects a combination with a smallest calculated circuit size from combinations whose calculated circuit sizes satisfy the constraint condition on the circuit size and whose calculated latencies satisfy the constraint condition on the latency.

5. The circuit design support apparatus according to claim 3, wherein the processing circuitry selects a combination with a shortest calculated latency from combinations whose calculated circuit sizes satisfy the constraint condition on the circuit size and whose calculated latencies satisfy the constraint condition on the latency.

6. The circuit design support apparatus according to claim 3, wherein for each of the combinations of external memory module candidates, the processing circuitry calculates, a circuit size of the design target circuit when all the memory modules described in the binding data are implemented as internal memories in the design target circuit, a circuit size of the external memory when the external memory module candidates included in the combination are implemented as the external memory, and a circuit size of a communication interface used by the design target circuit for communication with the external memory when the external memory module candidates included in the combination are implemented as the external memory, determines whether or not a circuit size satisifies the constraint condition on the circuit size, the circuit size being obtained by subtracting the circuit size of the external memory from the circuit size of the design target circuit and by adding the circuit size of the communication interface to a subtraction result, calculates a first latency occurring when all the memory modules described in the binding data are implemented as an internal memory in the design target circuit, and a second latency necessary for the design target circuit to acquire data from the external memory when the external memory module candidates included in the combination are implemented as the external memory, and determines whether or not a latency obtained by adding the second latency to the first latency satisifies the constraint condition on latency.

7. The circuit design support apparatus according to claim 1, wherein the processing circuitry analyzes, for each of the memory modules, timing of write access and timing of read access described in the binding data, calculates write data holding time that is a time from termination of write access to the memory module until last read access to data written in the memory module by the write access is started, and extracts a memory module whose calculated write data holding time is equal to or longer than a threshold as the external memory module candidate.

8. The circuit design support apparatus according to claim 1, wherein the processing circuitry acquires binding data describing the memory modules and a plurality of operating blocks to perform arithmetic operations, as functional modules of the design target circuit, and further describing, for each of the memory modules, timing of write access to the memory module and a write access operating block to perform the write access, and timing of read access to the memory module and a read access operating block to perform the read access, analyzes, for each of the memory modules, the timing of the write access and the write access operating block, and the timing of the read access and the read access operating block described in the binding data, calculates read access waiting time that is a time from when the write access operating block to perform write access of operand data to be used by the read access operating block for arithmetic operation starts operating until when the read access operating block is enabled to start read access to the operand data, and extracts a memory module whose calculated read access waiting time is equal to or longer than a threshold as the external memory module candidates.

9. A circuit design support method comprising:

acquiring binding data describing a plurality of memory modules as functional modules of a design target circuit and describing, for each of the memory modules, timing of write access and timing of read access to the memory module; and analyzing, for each of the memory modules, the timing of write access and the timing of read access described in the binding data, extracting an external memory module candidate that is a candidate for an external memory module to be implemented as an external memory outside of the design target circuit from the memory modules described in the binding data, and selecting the external memory module from the extracted external memory module candidate on a basis of a constraint condition on the design target circuit.

10. A non-transitory computer readable medium storing a circuit design support program causing a computer to execute:

a binding data acquiring process of acquiring binding data describing a plurality of memory modules as functional modules of a design target circuit and describing, for each of the memory modules, timing of write access and timing of read access to the memory module; and a memory module selecting process of analyzing, for each of the memory modules, the timing of write access and the timing of read access described in the binding data, extracting an external memory module candidate that is a candidate for an external memory module to be implemented as an external memory outside of the design target circuit from the memory modules described in the binding data, and selecting the external memory module from the extracted external memory module candidate on a basis of a constraint condition on the design target circuit.

* * * * *